United States Patent [19]

Kirkland et al.

[11] Patent Number: 4,619,066
[45] Date of Patent: Oct. 28, 1986

[54] FLOAT RELEASE DEVICES

[76] Inventors: Donald R. Kirkland, 1029 Edgewood Dr., Jacksonville, Tex. 75766; Paul J. Morcom, Rte. 3, Box 1088, Troop, Tex. 75789

[21] Appl. No.: 696,263

[22] Filed: Jan. 30, 1985

Related U.S. Application Data

[63] Continuation-in-part of Ser. No. 652,112, Sep. 19, 1984.

[51] Int. Cl.$^4$ .................. A01K 47/00; A01K 87/00
[52] U.S. Cl. ........................................... 43/25; 441/8
[58] Field of Search ............... 43/25; 114/326; 116/107; 441/8

[56] References Cited

U.S. PATENT DOCUMENTS

| 116,651 | 1/1916 | Beck | 114/323 |
|---|---|---|---|
| 806,730 | 12/1905 | Zoll | 441/8 |
| 1,860,327 | 5/1932 | Kuhn | 441/8 |
| 2,357,417 | 9/1944 | Marple | 441/8 |
| 2,403,718 | 9/1959 | Wright | 43/25 |
| 2,470,783 | 5/1949 | Mead | 441/8 |
| 2,494,892 | 8/1961 | Paradis | 43/25 |
| 2,687,541 | 8/1954 | Bannister | 43/25 |
| 2,791,785 | 5/1957 | Metts | 441/8 |
| 3,085,263 | 4/1963 | Yurkinas | 441/8 |
| 3,703,782 | 11/1972 | Brown | 43/25 |

Primary Examiner—Nicholas P. Godici
Assistant Examiner—C. McKee
Attorney, Agent, or Firm—John M. Harrison

[57] ABSTRACT

Float release devices which are releasible from submerged articles in order to mark the location of the articles, which devices include in a first embodiment, a double pressure-actuated float attached to a bracket by means of a pair of pressure-actuated release mechanisms for releasing the float when the float and bracket are submerged. Straps attached to the bracket serve to secure the float to a non-floating article and a plug in the release mechanism facilitates equalization of pressure in the release mechanism housing. In another embodiment of the invention a single pressure-actuated release mechanism is provided in cooperation with a float and bracket, which bracket is located on the exterior of the article to be protected, such as a fishing rod. In an alternative design for protecting a fishing rod, the pressure-release mechanism is located in the fishing rod handle for release when the fishing rod falls overboard. In another embodiment of the invention a water soluble, pin-actuated float is enclosed in the handle of a fishing rod and is designed for release when water softens the soluble pin.

14 Claims, 11 Drawing Figures

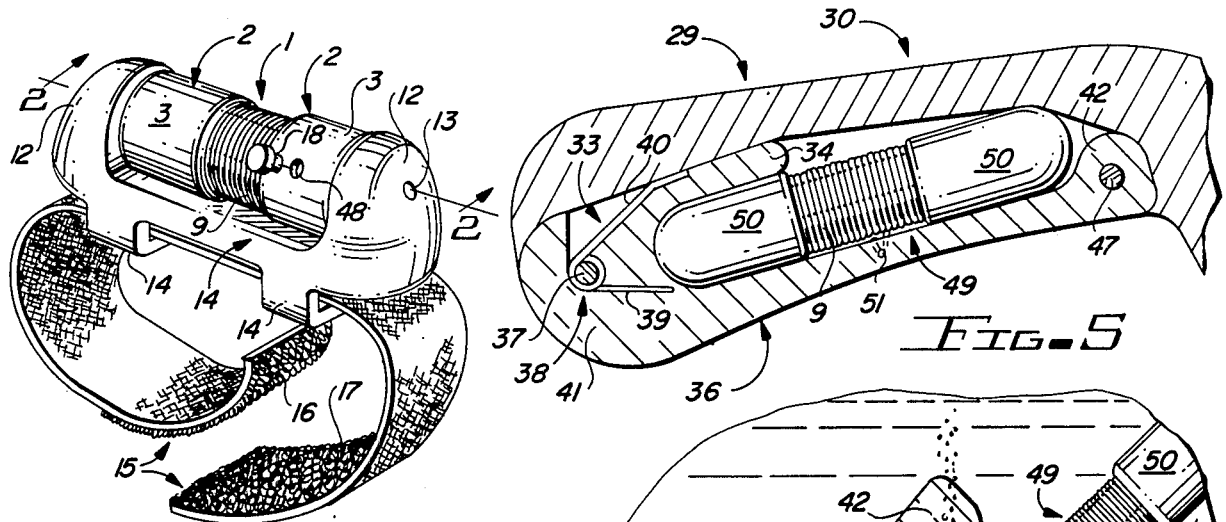
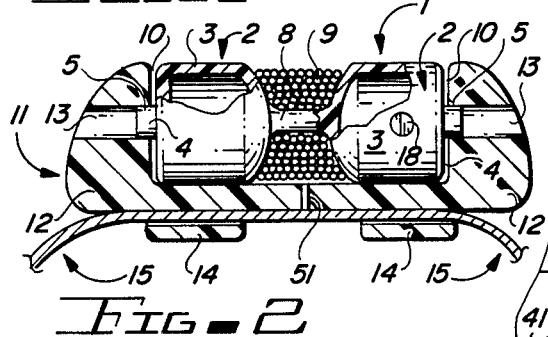
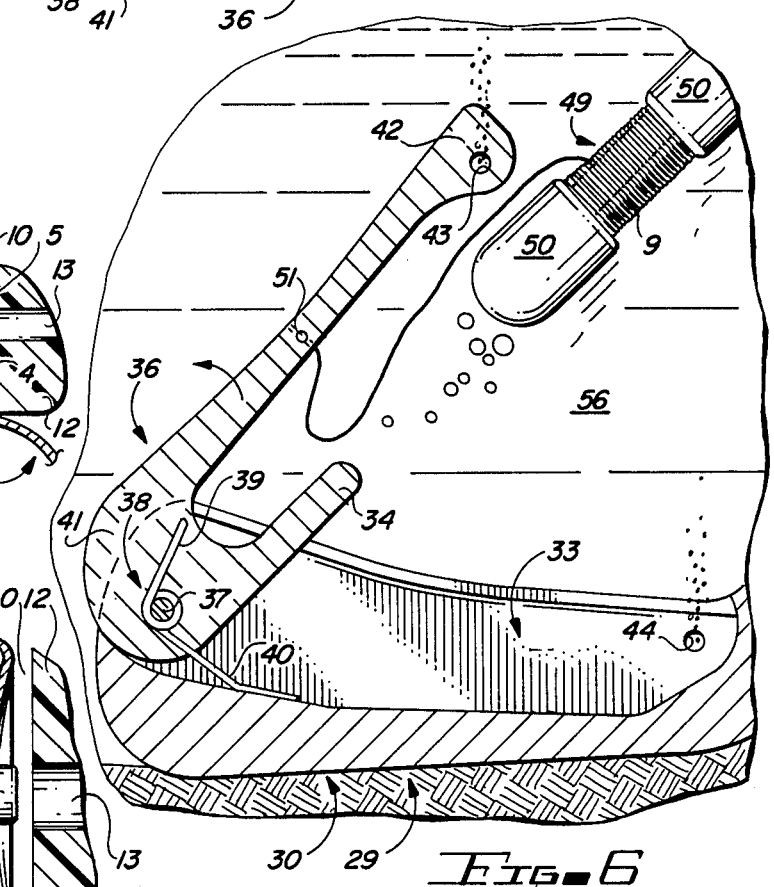
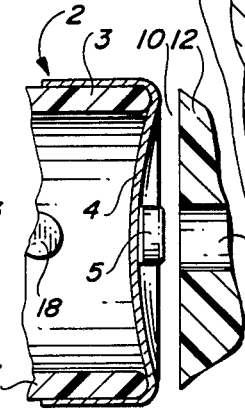
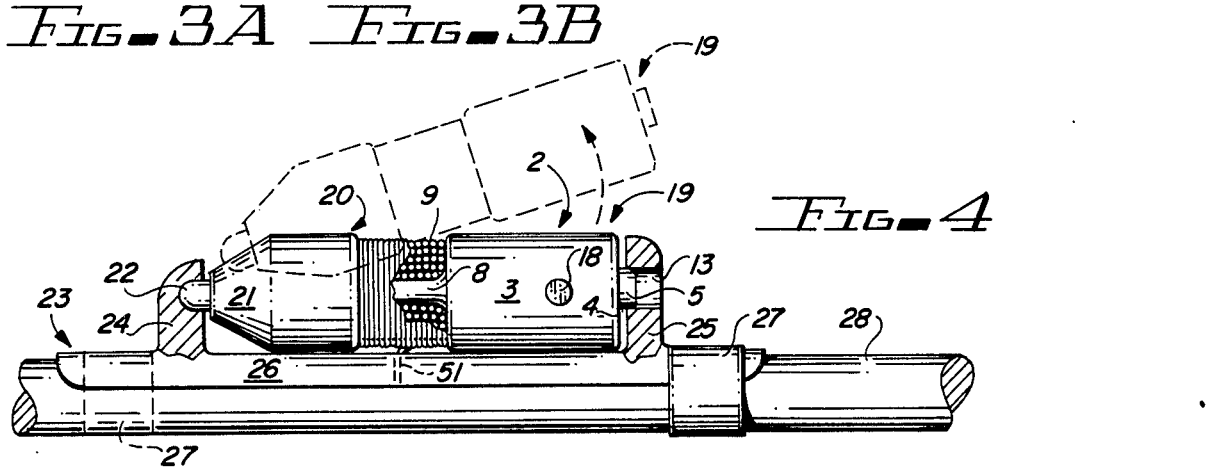

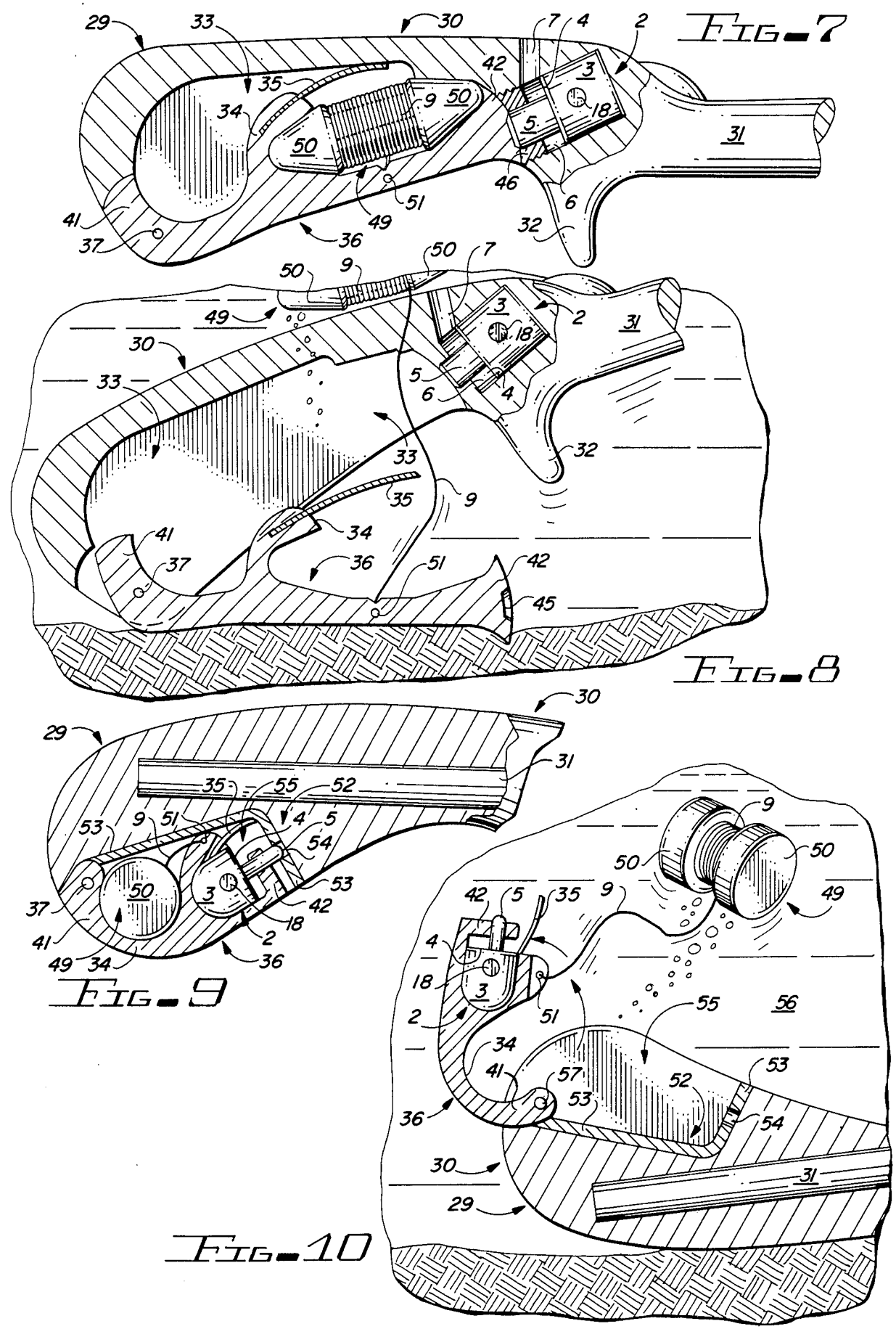

FLOAT RELEASE DEVICES

This invention is a continuation-in-part of my copending U.S. patent application Ser. No. 652,112, filed Sept. 19, 1984 and entitled "Rod Flotation Device".

BACKGROUND OF THE INVENTION

1. Field of the Invention

This invention relates to means for locating and retrieving submerged articles such as fishing rods and reels and more particularly, to float release devices which can be removably attached to non-floating fishing equipment or other articles or enclosed in the handles of fishing rods. A float component of the float release devices releases from a cooperating bracket or retaining means attached to the article or enclosed within a fishing rod handle responsive to water pressure, in one embodiment and by deterioration of a water-soluble pin in another embodiment. In the first embodiment, activation of a pressure-actuating release mechanism due to water pressure as the article sinks releases the float to indicate the location of the submerged article.

Among the most popular outdoor recreational activities is boating and fishing and a great deal of emphasis has been placed on the construction and maintenance of lakes, impoundments, reservoirs, rivers and streams to support these activites. In the United States alone, several thousand lakes and impoundments exist, many of which were created by man to serve not only as a source of water for cities and rural areas but also for recreation. It follows from a consideration of the large number of people involved in boating and fishing activities, that many objects and articles are lost in lakes and impoundments each year. Many of these articles, such as rods and reels, outboard motors, electric trolling motors and other fishing equipment immediately sink when they fall into the water and most are never recovered. The loss of expensive fishing rods and reels is a frequent event, since a rod can easily slip from a fisherman's grasp when the bait or lure is thrown or when the fisherman changes hands to operate the reel. Furthermore, many rod and reel combinations are lost overboard when the bait or lure is thrown into a likely-looking spot and the rod is placed in the boat while the fisherman directs his attention elsewhere, at which time the bait or lure is struck by a fish and the rod and reel pulled overboard. Many rods are also lost while the boat is moving from one fishing place to the next, as tree limbs and brush engage the rods and pull them overboard.

2. Description of the Prior Art

The location and retrieval of underwater objects has captured the attention of many people for many years. A variety of buoys, floats and similar flotation devices attached to anchor cables and employing various release mechanisms for deployment have long been used to locate submerged vessels, including stricken submarines and torpedoed merchant ships during war time. Typical of such mechanisms is the device illustrated in U.S. Pat. No. 1,166,651, dated Jan. 4, 1916, to C. E. Beck et al, which device discloses in one embodiment, an enclosed portion or compartment, preferably located in the conning tower of a submarine, which compartment can be detached from the main structure in the event of loss of control of the submarine while the vessel is submerged, to save the crew. In another embodiment a signal buoy is released by application of water pressure, which buoy can be adjusted to operate automatically at any predetermined depth to locate the submarine. U.S. Pat. No. 652,412, dated June 26, 1900, to G. W. Thomas et al, discloses an "Apparatus for Locating and Attaching Raising Means for Sunken Vessels". This device is characterized by multiple buoys fitted with flags and connecting lines wound on reels and placed in receptacles in a vessel, which receptacles further include water inlet means and a mechanical outlet closure, wherein the buoys are automatically released if the vessel is submerged and water enters the outlets. An "Automatic Sunken Water Craft Marker Buoy" is disclosed in U.S. Pat. No. 3,225,368, dated Dec. 28, 1965, to B. W. Allen. This device includes a spherically-shaped flotation member retained in attachment to a boat by means of resilient fingers and further including a coil of line having one end secured to the sphere and wound on a reel located in the support base, such that water pressure due to the buoyancy of the sphere releases the sphere from the resilient fingers in the event the vessel is submerged. U.S. Pat. No. 3,419,927, dated Jan. 7, 1969, to H. Stoffer, et al, discloses a "Self-Releasing Marker Buoy" which is characterized by a sphere defined by a pair of hemispheres, one of which hemispheres floats in the water. A cable is disposed within one of the hemispheres and is secured to the other hemisphere and a magnetic coupling joins the two hemispheres. One of the hemispheres is secured by suitable means to a non-floating object and when the non-floating object sinks in the water, the floating hemisphere is released from the non-floating hemisphere by water pressure due to the buoyancy of the floating hemisphere and the object can be located and retrieved by the cable connecting the two hemispheres. It is an object of this invention to provide float release devices which are capable of positively and quickly releasing a float from engagement with a bracket secured to a non-floating object or article when the non-floating article falls in the water and sinks.

Another object of this invention is to provide a soluble pin float-release device which is small, efficient and compact for location in a cavity produced in a fishing rod handle, which device is characterized by a float removably secured in a float lever pivoted to the rod handle, which float is releasible from the rod handle upon deterioration of a water soluble pin which normally retains the free end of the float lever in association with the rod handle.

Yet another object of this invention is to provide a new and improved, positively-releasing, soluble pin float-release device which is capable of being releasibly confined in the handle of a fishing rod and which operates pursuant to deterioration of the water soluble pin to release a float from the interior of the handle in the event that the fishing rod falls in the water, to locate and retrieve the fishing rod by means of a line connecting the float to the fishing rod handle.

A still further object of this invention is to provide a new and improved, soluble pin float-release device which is characterized by a float lever hinged to a fishing rod handle provided with an internal cavity and a float having a line wound thereon enclosed in the handle cavity and maintained therein by the float lever, with a water-soluble pin securing the free end of the the float lever to the handle, to facilitate release of the float upon deterioration of the soluble pin and location and retrieval of the rod by means of the float and line.

Yet another object of the invention is to provide a double pressure-actuated float release device which is characterized by a pair of pressure-actuated release mechanisms provided in a float and engaging a bracket attached to a non-floating object or article, which release mechanisms disengage the bracket responsive to water pressure as the article sinks and the float ascends to the surface in order to mark the location of the submerged article.

Another object of this invention is to provide a pressure-actuated float release device which includes a float containing an air chamber, a thin membrane covering an open end of the air chamber, a quantity of dye located in the air chamber and a pin secured to the membrane and engaging a bracket carrying the float, which bracket is secured to a non-floating article, wherein the float is releasible from the bracket and the dye escapes from the float when the membrane is ruptured responsive to an increase in water pressure as the article is submerged.

A still further object of the invention is to provide a pressure-actuated float release device which is carried in a hollow compartment provided in the handle of a fishing rod and includes a float provided with a length of line wound thereon, which float is releasible from the handle interior upon activation of a pressure-actuated release mechanism to release a lever hinged to the handle and allow the float to bob to the surface and mark the location of the rod.

Still another object of the invention is to provide a float release device which is contained in the handle of a fishing rod and is mounted in close proximity to a float lever hinged to the rod handle, which device further includes a pressure-actuated release mechanism carried by the handle and designed to disengage the free end of the float lever responsive to water pressure when the rod is submerged, in order to release a float carrying a line secured to the rod, and allow the float to ascend to the surface and mark the location of the rod.

Another object of the invention is to provide a pressure-actuated float release device which is characterized by at least one pressure-actuated release mechanism having a float containing a pressure housing, a diaphragm closing an open end of the pressure housing, a removable plug provided in the pressure housing for equalizing pressure inside the pressure housing to atmospheric pressure and a pin attached to the diaphragm for engaging a retaining means attached to a non-floating article or object for releasing the float responsive to water pressure when the object or article is submerged.

SUMMARY OF THE INVENTION

These and other objects of the invention are provided in new and improved float release devices which, in a preferred embodiment, are characterized by a shaped bracket and float having a water-actuated release mechanism therein, which bracket and float can be mounted to a non-floating object or article such as a rod and reel. In a preferred embodiment, a float and a water-actuated release mechanism which is not carried by the float are confined in a hollow cavity in the handle of a rod and reel. In a most preferred embodiment, a float is releasibly carried by a float lever hinged to the rod and reel handle and secured by a water-soluble pin. The float includes a line wound thereon and connecting the float to the handle, wherein the soluble pin deteriorates upon submersion of the rod and reel and the float releases from the interior of the handle to locate and permit retrieval of the rod from a water body. In another most preferred embodiment, the float release device of this invention is characterized by at least one pressure-actuated release mechanism which releases a float from a bracket or from the interior of a rod handle responsive to water pressure when the article or the rod and reel is submerged.

The invention will be better understood by reference to the accompanying drawings, wherein:

FIG. 1 is a perspective view of a preferred embodiment of a double pressure-actuated float according to this invention;

FIG. 2 is a sectional view, taken along line 2—2 in FIG. 1 of the double pressure-actuated float illustrated in FIG. 1;

FIG. 3A is a sectional view of a pressure-actuated release mechanism in retained configuration with respect to a pin retainer;

FIG. 3B is a sectional view of a pressure-actuated release mechanism in released configuration with respect to a pin retainer;

FIG. 4 is side view of a single pressure-actuated float device in engaged configuration with respect to a pin retainer;

FIG. 5 is a sectional view of a rod handle containing a handle float which is releasible from the handle by deterioration of a water soluble pin;

FIG. 6 is a sectional view of the rod handle illustrated in FIG. 5, with the float in released configuration;

FIG. 7 is sectional view of a rod handle containing a handle float which is releasible from the rod handle by means of a pressure-actuated release mechanism;

FIG. 8 is a sectional view of the rod handle illustrated in FIG. 7, with the float in released configuration;

FIG. 9 is a sectional view of an alternative design for a rod handle containing a float which is releasible from the rod handle by means of a pressure-actuated release mechanism enclosed in a float capsule; and FIG. 10 is a sectional view of the rod handle illustrated in FIG. 9, with the float in released configuration pursuant to operation of the pressure-actuated release mechanism.

DESCRIPTION OF THE PREFERRED EMBODIMENTS

Referring now to FIGS. 1 and 2 of the drawings, a double pressure-actuated float is generally illustrated by reference numeral 1 and includes a pressure-actuated release 2 at each end, joined by a spool 8. A quantity of line 9 is wound on the spool 8 and one end of the line is tied to the spool 8, while the opposite end is attached to an anchor point 51, located on the float bracket 11. Each pressure-actuated release 2 is characterized by a pressure housing 3, which is open at one end and a flexible diaphragm 4 closing the open end. A plug 18 is designed to tightly fit into a plug opening 48 in the pressure housing 3, in order to faciliate atmospheric pressure inside the pressure housing 3 at all altitudes and in all weather conditions, as hereinafter described. A diaphragm pin 5 is attached to the center of the diaphragm 4 and extends outwardly of the diaphragm 4 into a retainer opening 13, provided in the oppositely-disposed pin retainers 12, shaped in the float bracket 11. As illustrated in FIG. 2, each diaphragm 4 and pressure-actuated release 2 are spaced from a corresponding pin retainer 12 by a clearance 10, in order to facilitate the flow of water between the diaphragms 4 and the respective pin retainers 12. Furthermore, in a preferred embodiment the retainer openings 13 extend through the pin retainers 12, in order to facilitate water contact with the diaphragm pins 5 when the double pressure-actuated float 1 is submerged. A strap 15 engages a pair of strap flanges 14 shaped in the float bracket 11 and the ends of the strap 15 are fitted with loops 16 and cooperating piles 17, to secure the double pressure-actuated float 1 to a submersible article or to the wrist of a person.

Referring now to FIG. 4 of the drawings, in another preferred embodiment of the invention a single pressure-actuated float 19 is disclosed, with a single pressure-actuated release 2 provided on one end thereof and a front segment 20 located at the opposite end. The front segment 20 is separated from the pressure housing 3 of the pressure-actuated release 2 by a spool 8, containing a quantity of line 9. One end of the line 9 is attached to the spool 8, while the opposite end is secured to an anchor point 51 located on the rod bracket base 26 of a rod bracket 23. The front segment 20 of the single pressure-actuated float 19 is characterized by a tapered cone 21 having a projecting cone tip 22, which engages a cone tip retainer 24 in the rod bracket 23. The diaphragm pin 5, extending from the diaphragm 4 in the pressure-actuated release 2 on the opposite end of the single pressure-actuated float 19, projects into a retainer opening 13 located in a pin retainer 25, which is attached to the rod bracket base 26 and is spaced from the cone tip retainer 24. A pair of base rings 27 serve to removably attach the rod bracket 23 to a fishing rod 28. The position of the single pressure-actuated float 19 in released configuration is illustrated in phantom and the release sequence is hereinafter described. A plug 18 seals a plug opening 48 in the pressure housing 3, as illustrated in FIG. 1, to equalize air pressure in the pressure housing 3, as hereinafter described.

Referring now to FIGS. 7 and 8 of the drawings, in another preferred embodiment of the invention a handle float 49 is disposed in the grip cavity 33 of a grip 30, provided in a rod handle 29. The rod handle 29 is connected to a fishing rod (not illustrated) by means of a rod shank 31 and a conventional finger grip 32 projects from the grip 30, in order to facilitate secure gripping of the rod handle 29. The bottom portion of the grip 30 is defined by a float lever 36, which is pivotally attached to the grip 30 by means of a lever pin 37. The float lever 36 is further characterized by an upwardly extending float seat 34, which carries one end of a leaf spring 35, with the opposite end of the leaf spring 35 biased against the inside surface of the grip 30, as illustrated in FIG. 7. The pivoting end 42 of the float lever 36 is provided with a lever slot 45, as illustrated in FIG. 8, for registration with the diaphragm pin 5 of a pressure-actuated release 2, which is similar in design to the pressure-actuated release 2 illustrated in FIGS. 1, 2 and 4 and is mounted in the grip 30. Accordingly, referring again to FIG. 7, it will be appreciated that the float lever 36 is maintained in closed configuration against the bias of the leaf spring 35 when the diaphragm pin 5 engages the lever slot 45 of the pivoting end 42. The pressure-actuated release 2 illustrated in FIGS. 7 and 8 is further characterized by a pressure housing 3, having a pressure-equalizing plug 18 therein and a water chamber 6, which communicates with a water access aperture 7 provided in the grip 30, to facilitate water access to the diaphragm 4 and water pressure exertion against the diaphragm 4. In a preferred aspect of this embodiment of the invention, the pressure-actuated release 2 is retained in the grip 30 by means of a keeper nut 46, which engages cooperating internal threads (not illustrated) provided in the grip 30. The float body 50 of the handle float 49 is cradled in a float seat 34 provided in the float lever 36 and a length of line 9 is wound on a spool (not illustrated) provided in the center of the float body 50, with one end of the line 9 attached to the anchor point 51 in the pivoting end 42 of a float lever 36. The opposite end of the line 9 is attached to the float body 50. Accordingly, when the rod handle 29 is submerged in a body of water 56, the pivoting end 42 of the float lever 36 swings outwardly responsive to activation of the pressure-actuated release 2 and the bias of the leaf spring 35, and the handle float 49 is projected outwardly of the grip cavity 33 and is allowed to float upwardly, as illustrated in FIG. 8. The line 9 serves to connect the handle float 49 to the pivoting end 42 of the float lever 36, in order to facilitate retrieval of a fishing rod (not illustrated) which is attached to the rod handle 29.

Referring now to FIGS. 9 and 10 of the drawings in yet another embodiment of the invention, and under circumstances where the fishing rod is characterized by a rod handle 29 wherein the rod shank 31 extends through the center of the grip 30, a float capsule 52 is embedded in a portion of the grip 30. The float capsule 52 is characterized by shaped capsule housing 53, which is mounted to the grip 30 and includes a cooperating float lever 36, provided with a lever base 41, which is pivotally mounted to the grip 30 by means of a lever pin 37. The opposite end of the float lever 36 is characterized by a pivoting end 42, which cradles a pressure-actuated release 2, having a pressure housing 3 with a pressure-equalizing plug 18 therein, a diaphragm 4 and a diaphragm pin 5 extending through the pivoting end 42 and into a housing aperture 54 provided in the capsule housing 53, when the float lever 36 is in the configuration illustrated in FIG. 9. A handle float 49 is deployed in the float seat 34 located in the housing cavity 55 of the float lever 36 and is characterized by a generally cylindrically-shaped float body 50, having a spool (not illustrated) therein with a quantity of line 9 wound thereon. One end of the line 9 is attached to the spool, while the opposite end is secured to an anchor point 51 provided in the float lever 36. Accordingly, referring again to FIG. 9 of the drawing, the handle float 49 is secured to the float seat 34 when the float lever 36 is in closed configuration, with the diaphragm pin 5, carried by the diaphragm 4, extending into the housing aperture 54 of the housing 52. When the rod handle 29 and the rod 28 are dropped into a body of water 56, water pressure is exerted against the diaphragm 4 as hereinafter described and the diaphragm pin 5 releases from the housing aperture 54 to permit the float lever 36 to open, as illustrated in FIG. 10. This action facilitates release of the handle float 49 to the surface of the water body 56, in order to locate and retrieve the rod handle 29 and the fishing rod (not illustrated) attached to the rod handle 29.

Referring now to FIGS. 3A and 3B of the drawing and initally to FIG. 3A, the double pressure-actuated float 1, single pressure-actuated float 19 and each pressure-actuated release 2 illustrated in the FIGS. 7-10 embodiments of the invention all operate as follows: Each pressure-actuated release 2 is characterized by a flexible, waterproof diaphragm 4 which closes over the open end of a corresponding pressure housing 3 and is undeformed by pressure differential, since the air pressure inside the pressure housing 3 is equal to the atmospheric pressure outside thereof. This equalization of air pressure inside the pressure housing 3 with the atmospheric pressure at any elevation where the float release device is used, is insured by removing the plug 18 from the plug opening 48, as illustrated in FIG. 1, to equalize the pressure. Replacement of the plug 18 in the plug opening 48 readies the pressure-actuated release 2 for use at current atmospheric conditions. Referring to FIG. 3B, when the rod handle 29, the double pressure-acutated float 1 or the single pressure-actuated float 19 is submerged in a body of water 56, water pressure causes the diaphragm 4 in each pressure-actuated release 2 to deform inwardly against the atmospheric pressure inside the pressure housing 3, as illustrated. This action causes the diaphragm pin 5 which is attached to each diaphragm 4 to retract from the corresponding retainer opening 13 of the double pressure-actuated float 1 illustrated in FIGS. 1 and 2 and the single pressure-actuated float 19, illustrated in FIG. 4, to facilitate flotation of the double pressure-actuated float 1 and the single pressure-actuated float 19 freely of the float bracket 11 and the rod bracket 23, respectively. This configuration of the diaphragm 4 also enables a diaphragm pin 5 to retract from the lever slot 45, illustrated in FIGS. 7 and 8 and from the housing aperture 54, illustrated in FIGS. 9 and 10, to facilitate release of the handle float 49 in each case from the respective grip 30.

Referring now to FIGS. 5 and 6 of the drawings, in yet another embodiment of the invention a handle float 49 is disposed in engagement with a float lever 36, which is pivotally attached to a grip 30 by means of a lever pin 37. The float lever 36 is characterized by a pivoting end 42, provided with a pivoting end aperture 43, which pivoting end 42 is secured to the grip 30 by means of a soluble pin 47. The soluble pin 47 extends through a grip aperture 44 in the grip 30 and a pivoting end aperture 43, which registers with the grip aperture 44, to secure the float lever 36 in closed configuration, as illustrated in FIG. 5. In a preferred embodiment, a coil spring 38 is situated with a bottom tine 40 attached to the grip 30 and a top tine 40 embedded in the float lever 36, as illustrated. As in the case of the handle floats 49 illustrated in FIGS. 7–10 of the drawings, the handle float 49 illustrated in FIGS. 5 and 6 is characterized by a float body 50, provided with a spool (not illustrated) having a length of line 9 wound thereon, with one end of the line 9 attached to the spool and the opposite end secured to an anchor point 51 located in the float lever 36. Accordingly, when the grip 30 is immersed in a body of water 56, the soluble pin 47 dissolves, softens or deteriorates and the bias in the coil spring 38 causes the float lever 36 to open as illustrated in FIG. 6 and release the handle float 49.

It will be appreciated that various bias means can be used in the float release devices of this invention as illustrated in FIGS. 5–10, in order to effect pivoting of each float lever 36 on a lever pin 37 to release the handle floats 49. Accordingly, in each case, either a leaf spring 35, a coil spring 38 or an equivalent biasing device known to those skilled in the art, can be utilized.

In detailed operation of the soluble pin-activated float release device as illustrated in FIGS. 5 and 6, it will be first appreciated that the soluble pin 47 is characterized by a small segment of a water-soluble material such as spaghetti, or durum semolina, which may optionally be painted or coated with one or more coats of paint, wax or other material to retard dissolvable deterioration when only incidently placed in contact with water. One or more coats of paint may therefore be required in order to prevent undesirable opening of the float lever 36 and detachment of the handle float 49 from the float lever 36 during a rainstorm or when water is inadvertently spilled on the rod handle 20. When the rod handle 29 is inadvertently submerged by slipping from the fisherman's hand, falling overboard, or by other means, water immediately begins permeating and softening the soluble pin 47. Under circumstances where the soluble pin 47 is painted or otherwise coated, the water penetrates the durum semolina through the ends, rather than both through the ends and axially, and deterioration of the durum semolina proceeds more slowly than under circumstances where the soluble pin 47 is left uncoated. When the soluble pin 47 has softened to a sufficient extent under submerged conditions such that the float lever 36, acting under the bias of the coil spring 38, opens, the handle float 49 releases from association with the float lever 36, as illustrated in FIG. 6. The handle float 49 is then free to move away from the grip 30 and float upwardly. Since one end of the line 9 is attached to the anchor point 51 of the float lever 36 and the opposite end to the handle float 49, a quantity of line 9 is free to unwind from the spool of the handle float 49 and allow the handle float 40 to quickly ascend to the surface of the water body 56.

Referring again to FIGS. 6, 8 and 10 of the drawings, it will be appreciated by those skilled in the art that regardless of the orientation of the handle float 49 and the respective grip 30, that is, whether the float lever 36 of the grip 30 is facing upwardly or downwardly while sinking or located on the bottom of a lake, river or stream, the handle float 49 will release from the grip 30 due to the bias in the leaf spring 35 or the coil spring 38, the action of the float lever 36, and the buoyancy of the handle float 49.

It will be appreciated by those skilled in the art that both the double-pressure actuated float 1 and the single pressure-actuated float 19 of this invention can be shaped and designed to attach to substantially any non-floating object or article which might be accidentally submerged and can be manufactured of any material known to those skilled in the art, so long as each respective pressure housing 3 is characterized by sufficent buoyancy to separate from the float bracket 11 and rod bracket 23, respectively, after submersion. Such materials as thermoplastic or thermoresin compositions, commonly known as "plastics" and including polypropylene and polyethylene, in non-exclusive particular, can be used to manufacture each hollow, air-filled pressure housing 3, according to molding and construction techniques well known to those skilled in the art. While the float bracket 11 and rod bracket 23 can also be made of a variety of materials including metal, plastic, fiberglass and the like, a preferred material of choice is plastic, due to the ease of manufacture to a desired shape by such techniques as injection molding. Furthermore, in each of the embodiments of the invention illustrated in FIGS. 1–4 and 7–10 where one or more pressure-actuated release 2 is utilized, the diaphragm 4 can be manufactured of a variety of materials varying thickness, depending upon the release characteristics desired. For example, referring again to FIGS. 1, 2 and 4, the diaphragm 4 in each case can be manufactured of a thin metal, such as aluminum foil, or water-soluble material such as paper, which will rupture or deteriorate upon submersion to release a dye located in the pressure housing 3. The dye serves to help mark the location of the article secured to the double pressure-actuated float 19, and can also serve to locate a swimmer or diver wearing the double pressure-actuated float 1, in an emergency. However, under circumstances where the sole function of the diaphragm 4 is to deform to disengage the diaphragm pin 5 from the retainer opening 13, the diaphragm 4 is preferably formed from a resilient material such as rubber, having a thickness which corresponds to a desired release depth.

Referring again to FIG. 4 of the drawings, it will be appreciated that the rod bracket 23 can be formed integrally with the rod 28 instead of attached by means of base rings 27. Brackets of other design can also be used in cooperation with non-floating objects of various size and shape, according to the teachings of this invention.

It will be further appreciated by those skilled in the art that both the pressure-actuated and the soluble pin-actuated float release mechanisms used in the FIGS. 5, 6 and 7-10 embodiments of this invention can also be used to locate and retrieve objects and articles other than fishing rods. For example, a release mechanism designed according to the teachings of this invention can be implemented in tackle boxes, outboard motors, trolling motors and other non-floating accessories.

While the preferred embodiments of the invention have been described above, it will be recognized and understood that various modifications may be made therein and the appended claims are intended to cover all such modifications which may fall within the spirit and scope of the invention.

Having described my invention with the particularity set forth above what is claimed is:

1. A float release device in combination with a fishing rod handle for locating and retrieving a submerged fishing rod, said handle having an opening or cavity provided therein, said combination comprising lever means pivotally carried by the rod handle and substantially closing the cavity when in closed configuration; bias means biasing said lever means in open configuration; flotation means located in the cavity; and release means cooperating with said lever means and the rod handle to close said lever means against the bias of said bias means, said lever means including pocket means pivotal therewith for loosely retaining said flotation means whereby said lever means opens by operation of said bias means and said flotation means exits the cavity responsive to operation of said release means when the object is submerged.

2. The combination of claim 1 wherein said release means is a water-soluble pin extending through said lever means and engaging the rod handle when said lever means is in closed configuration.

3. The combination of claim 2 further comprising a line normally wound on said flotation means and connecting said flotation means to the rod handle, said line adapted for unwinding from said flotation means when said flotation means is separated from the rod handle.

4. The combination of claim 1 wherein said release means is an air chamber carried by the rod handle and located in the cavity; a flexible diaphragm closing said air chamber; and a pin attached to said diaphragm and engaging said lever means, whereby said diaphragm deforms responsive to an increase in water pressure to release said pin from said lever means when the rod handle is submerged.

5. The combination of claim 4 further comprising a line normally wound on said flotation means and connecting said flotation means to the rod handle, said line adapted for unwinding from said flotation means when said flotation means is separated from said rod handle.

6. The combination of claim 4 further comprising an opening in said air chamber, said opening communicating with the atmosphere and a plug removably closing said opening, whereby air pressure inside said air chamber is equal to air pressure in the atmosphere when said plug is removed from said opening.

7. The combination of claim 4 further comprising:
 (a) a line normally wound on said flotation means and connecting said flotation means to the rod handle, said line adapted for unwinding from said flotation means when said flotation means is separated from said rod handle; and
 (b) an opening in said air chamber, said opening communicating with the atmosphere and a plug removably closing said opening, whereby air pressure inside said air chamber is equal to air pressure in the atmosphere when said plug is removed from said opening.

8. The combination of claim 7 wherein said bias means is a coil spring biased between the rod handle and said lever means and further comprising a water access opening in said rod handle and a water chamber provided in said pressure housing, said water chamber in communication with said diaphragm and said water access opening, whereby water is permitted to contact said diaphragm when the rod handle is submerged.

9. A float release device in combination with a fishing rod handle for locating and retrieving submerged fishing rods, said rod handle with a cavity or opening provided therein, said combination comprising:
 (a) a lever having one end pivotally attached to the handle and the opposite end pivotable to substantially close the cavity, said lever further including pocket means pivotal therewith
 (b) bias means carried by the handle and contacting said lever for biasing said lever in the open configuration;
 (c) a float disposed in the cavity loosely retained within said pocket means and a line wound on said float, with one end of said line attached to said float and the other end of said line attached to the handle; and
 (d) release means carried by the handle and removably cooperating with said opposite end of said lever, said release means closing the lever on the handle against said bias means, whereby said lever opens by operation of said bias means and said flotation means exits the cavity responsive to operation of said release means when the fishing rod is submerged.

10. The combination of claim 9 wherein said release means is a water-soluble pin extending through said lever means and engaging the handle when said lever means is in the closed configuration.

11. The combination of claim 9 wherein said release means is an air chamber carried by said flotation means; a flexible diaphragm closing said air chamber; and a pin attached to said diaphragm and engaging said lever means, whereby said diaphragm deforms responsive to an increase in water pressure to release said pin from said lever means when the object is submerged.

12. The combination of claim 11 wherein said line is adapted for unwinding from said float when said float is separated from the handle.

13. The combination of claim 12 further comprising an opening in said air chamber, said opening communicating with the atmosphere and a plug removably closing said opening, whereby air pressure inside said air chamber is equal to air pressure in the atmosphere when said plug is removed from said opening.

14. The combination of claim 9 wherein said release means further comprises an air chamber having an open end; a pressure-sensitive membrane closing said open end of said air chamber; and a dye located in said air chamber, whereby said diaphragm ruptures responsive to an increase in water pressure to release the dye from said air chamber when the object is submerged.

* * * * *